(12) United States Patent
Zou et al.

(10) Patent No.: US 11,029,322 B2
(45) Date of Patent: Jun. 8, 2021

(54) CONVEYING SYSTEM FOR BIOCHEMICAL ANALYZER

(71) Applicant: NINGBO MEDICAL SYSTEM BIOTECHNOLOGY CO., LTD., Ningbo (CN)

(72) Inventors: Jihua Zou, Ningbo (SG); Tao Xiong, Ningbo (CN); Xiaohui Wu, Ningbo (CN); Shangqing Xiao, Ningbo (CN); Lei Xu, Ningbo (CN); Zhe Feng, Ningbo (CN)

(*) Notice: Subject to any disclaimer, the term of this patent is extended or adjusted under 35 U.S.C. 154(b) by 55 days.

(21) Appl. No.: 16/446,254

(22) Filed: Jun. 19, 2019

(65) Prior Publication Data
US 2020/0011886 A1    Jan. 9, 2020

Related U.S. Application Data

(63) Continuation of application No. PCT/CN2017/071370, filed on Jan. 17, 2017.

(51) Int. Cl.
*G01N 35/00* (2006.01)
*G01N 35/04* (2006.01)

(52) U.S. Cl.
CPC ......... *G01N 35/0095* (2013.01); *G01N 35/04* (2013.01); *G01N 2035/0462* (2013.01)

(58) Field of Classification Search
CPC ............... G01N 35/0095; G01N 35/04; G01N 2035/0462; G01N 35/0096; G01N 35/1081; G01N 35/109

USPC .............. 73/864.81, 864.21–864.24, 864.31; 422/63, 64, 67
See application file for complete search history.

(56) References Cited

U.S. PATENT DOCUMENTS

| | | | | |
|---|---|---|---|---|
| 2009/0162247 A1* | 6/2009 | Tokieda | .................. | G01N 35/04 422/65 |
| 2010/0248293 A1* | 9/2010 | Kuwano | ............ | G01N 35/0092 435/29 |
| 2015/0241458 A1* | 8/2015 | Pollack | .................. | G01N 35/04 700/230 |

* cited by examiner

*Primary Examiner* — Robert R Raevis
(74) *Attorney, Agent, or Firm* — W&K IP

(57) ABSTRACT

A biochemical analyzer delivery system, comprising a sample feeding track (42), an advancing track (43), a recovery track (44), at least one to-be-tested sub-track (45), at least one emergency sub-track (46) and at least one return sub-track (47); the sample feeding track (42), the advancing track (43) and the recovery track (44) are parallel to each other; the to-be-tested sub-track (45), the emergency sub-track (46) and the return sub-track (47) are disposed between and perpendicular to the sample feeding track (42) and the advancing track (43), an emergency sample may enter the emergency sub-track via the advancing track (43), and then enters the sample feeding track for sample suction. The track-based delivery system can be horizontally disposed in a biochemical analyzer, and can be butt-jointed with a vertical track in the biochemical analyzer, thereby greatly increasing the buffer amount of sample holders without increasing the length of the biochemical analyzer.

10 Claims, 17 Drawing Sheets

CONVEYING SYSTEM FOR BIOCHEMICAL ANALYZER

CROSS-REFERENCE TO RELATED APPLICATIONS

This application is a continuation of International Patent Application No. PCT/CN2017/071370 with a filing date of Jan. 17, 2017, designating the United States, now pending, and further claims priority to Chinese Patent Application No. 201611177372.7 with a filing date of Dec. 19, 2016. The content of the aforementioned application, including any intervening amendments thereto, is incorporated herein by reference.

TECHNICAL FIELD

The present disclosure relates to the technical field of medical equipment, in particular to a biochemical analyzer delivery system.

BACKGROUND

With the rapid development of the modern technology, automation equipment has been widely used in the biomedical testing industry on the grounds that it can substitute for a majority of tedious manual operation with the obvious advantages of accurate result, small error, biochemical pollution prevention, high testing speed and high efficiency. As such, a biochemical analyzer is common medical equipment. However, there still remain some deficiencies in the biochemical analyzer of the prior art, e.g., a vertical delivery model is generally used in the track delivery system of the existing biochemical analyzer, that is to say, tracks are arrayed along the length direction of the biochemical analyzer, therefore, it may suffer from insufficient sample holder buffering capability, under this circumstance, only two sample holders can be buffered. Hence, for the purpose of enhancing the buffering capability, it is bound to lengthening the biochemical analyzer, which will accordingly occupy more space.

SUMMARY

The technical problem to be solved by this present disclosure is to provide a biochemical analyzer delivery system which can be transversely arranged in a biochemical analyzer and achieves abutting joint with longitudinal tracks in the biochemical analyzer so as to greatly increase the sample holder buffering capability without lengthening the biochemical analyzer.

The technical solution adopted by the present disclosure provides a biochemical analyzer delivery system structurally comprising a sample feeding track, an advancing track, a recovery track, at least one to-be-tested sub-track, at least one emergency sub-track and at least one return sub-track. The sample feeding track, the advancing track and the recovery track are parallel to each other. The to-be-tested sub-track, the emergency sub-track and the return sub-track are disposed between and perpendicular to the sample feeding track and the advancing track.

By adopting the abovementioned structure, the biochemical analyzer delivery system of the present disclosure has the following advantages as compared with the prior art:

The biochemical analyzer delivery system of the present disclosure comprises a sample feeding track, an advancing track, a recovery track, a to-be-tested sub-track, an emergency sub-track and a return sub-track. A sample holder on the advancing track is buffered to the to-be-tested sub-track, so that the amount of buffered sample holders is greatly increased and the off-line time of an operator is prolonged. An emergency sample may enter the emergency sub-track via the advancing track, and then enters the sample feeding track for sample suction. The to-be-tested sub-track and the emergency sub-track are two tracks independent from each other. Hence, the delivery of an emergency sample will have no impact on buffering of sample holders on the to-be-tested sub-track meanwhile normal detection of a biochemical analyzer is barely influenced. A sample holder on the sample feeding track is delivered to the advancing track by the return sub-track for next test or to the recovery track for recovery.

Preferably, such a design that the to-be-tested sub-track, the emergency sub-track and the return sub-track are arrayed sequentially along the length direction of the biochemical analyzer embodies the optimal embodiment.

Preferably, the junction part of the to-be-tested sub-track and the advancing track is provided with a to-be-tested sub-track inlet push plate for pushing a sample holder on the advancing track to the to-be-tested sub-track. The junction part of the emergency sub-track and the advancing track is provided with an emergency sub-track inlet push plate for pushing a sample holder on the advancing track to the emergency sub-track. By adopting the foresaid structure, a sample holder on the advancing track is pushed to the to-be-tested sub-track through the to-be-tested sub-track inlet push plate and a sample holder on the advancing track is pushed to the emergency sub-track through the emergency sub-track inlet push plate, therefore, the structure is simple and implementation convenient.

Preferably, the junction part of the to-be-tested sub-track and the advancing track is further provided with a to-be-tested sub-track inlet detector and a to-be-tested sub-track inlet baffle. The junction part of the emergency sub-track and the advancing track is further provided with an emergency sub-track inlet detector and an emergency sub-track inlet baffle. By adopting the above structure, the to-be-tested sub-track inlet detector is used for detecting whether a sample holder exists or not at the inlet of the to-be-tested sub-track, and the to-be-tested sub-track inlet baffle is used for limiting the sample holder at the inlet of the to-be-tested sub-track. The emergency sub-track inlet detector is used for detecting whether a sample holder exists or not at the inlet of the emergency sub-track, and the emergency sub-track inlet baffle is used for limiting the sample holder at the inlet of the emergency sub-track.

Preferably, one end proximate the sample feeding track of the to-be-tested sub-track is provided with a to-be-tested sub-track outlet push plate for pushing a sample holder on the to-be-tested sub-track to the sample feeding track. One end proximate the sample feeding track of the emergency sub-track is provided with an emergency sub-track outlet pushing mechanism for pushing a sample holder on the emergency sub-track to the sample feeding track. By adopting the above structure, the to-be-tested sub-track outlet push plate is used for pushing a sample holder on the to-be-tested sub-track to the sample feeding track, and the emergency sub-track outlet pushing mechanism is used for pushing a sample holder on the emergency sub-track to the sample feeding track, therefore, the structure is simple and implementation convenient.

Preferably, one end proximate the sample feeding track of the to-be-tested sub-track is further provided with a to-be-tested sub-track outlet limit baffle mechanism. One end proximate the sample feeding track of the emergency sub-track is provided with an emergency sub-track outlet limit baffle mechanism. By adopting the above structure, the to-be-tested sub-track outlet limit baffle mechanism is used for limiting a sample holder on, the to-be-tested sub-track, and the emergency sub-track outlet limit baffle mechanism is used for limiting a sample holder on the emergency sub-track.

Preferably, the junction part of the to-be-tested sub-track and the sample feeding track is provided with a to-be-tested sample in-place detector and a conventional avoiding shield. The junction part of the emergency sub-track and the sample feeding track is provided with an emergency sample in-place detector and a sequential sample suction shield. By adopting the above structure, the to-be-tested sample in-place detector is used for detecting whether a to-be-tested sample is in place on the sample feeding track, but if there is an emergency sample on the sample feeding track, the conventional avoiding shield is used for limiting a conventional sample to give priority to the emergency sample for detection. The emergency sample in-place detector is used for detecting whether an emergency sample is in place on the emergency sub-track. During sample suction, the sequential sample suction shield is used for limiting the sample holder.

Preferably, the return sub-track has a return transmission rack that reciprocates among the return sub-track, the sample feeding track, the advancing track and the recovery track for delivering a sample holder on the sample feeding rack to the advancing track or the recovery track. By adopting the above structure, the return transmission rack is used for delivering sample holders among the sample feeding track, the advancing track and the recovery track so as to take the sample holders into next testing procedure or directly recover the sample holders.

Preferably, the junction part of the sample feeding track and the return sub-track is provided with a return sample holder in-place detector. By adopting the above structure, whether a sample holder exists or not at the inlet of the return sub-track is detected.

Preferably, a bridging avoidance component is disposed between the advancing track and the recovery track, for bridging the advancing track with the recovery track and avoiding the return transmission rack. By adopting the above structure, the bridging avoidance component also can deliver a sample holder on the advancing track to the recovery track, thereby being simple in structure and perfect in function.

REFERENCE NUMERALS

1 first support; 2 conveyer belt; 3 driven wheel; 4 first idle wheel; 5 second idle wheel; 6 adjusting rack; 7 slide plate; 8 space; 9 push plate; 9.1 push plate body; 9.2 pushing plate; 10 tensioning wheel; 11 anti-roll depression bar; 12 supporting plate; 13 bolt; 14 baffle; 14.1 body; 14.2 occulting bar; 14.3 pull rod; 15 second support; 16 electromagnet; 17 articulated shaft; 18 front limiting block; 19 rear limiting block; 20 mounting plate; 21 first transmission-type optical interrupter; 21.1 first interrupt slot; 22 support body; 23 horizontal guide rail; 24 propulsive guide plate; 24.1 guide groove; 25 thrust roller; 26 rotating wheel; 27 thrust baseplate; 28 second slider; 29 lifting guide plate; 29.1 lifting guide groove; 30 guide roller; 31 upper elastic sheet; 32 lower elastic sheet; 33 vertical guide rail; 34 fixing plate; 35 first slider; 36 tension spring; 37 third support; 38 second transmission-type optical interrupter; 38.1 second interrupt slot; 39 drive wheel; 40 band carrier; 41 propulsive mounting plate; 42 sample feeding track; 43 advancing track; 44 recovery track; 45 to-be-tested sub-track; 46 emergency sub-track; 47 return sub-track; 48 to-be-tested sub-track inlet push plate; 49 emergency sub-track inlet push plate; 50 to-be-tested sub-track inlet detector; 51 to-be-tested sub-track inlet baffle; 52 emergency sub-track inlet detector; 53 emergency sub-track inlet baffle; 54 tested sample in-place detector; 55 conventional avoiding shield; 56 emergency sample in-place detector; 57 sequential sample suction shield; 58 fourth support; 58.1 strip-shaped hole; 59 return transmission rack; 59.1 clamp plate; 59.2 connecting plate; 60 retainer plate; 60.1 boss; 61 return baffle; 62 support frame; 63 third motor; 64 first drive wheel; 65 first driven wheel; 66 first band carrier; 67 bridging frame; 67.1 bridging plate; 67.2 connector; 68 fourth motor; 69 second drive wheel; 70 second driven wheel; 71 second band carrier; 72 linear guide rail; 73 slider; 74 return tension spring; 75 sliding plate; 76 tension spring connector; 77 first position detector; 78 second position detector; 79 third position detector; 80 fourth position detector.

DETAILED DESCRIPTION OF THE EMBODIMENTS

The present disclosure will be further explained in detail below in combination with the appended drawings and the specific embodiments.

Figure 1:
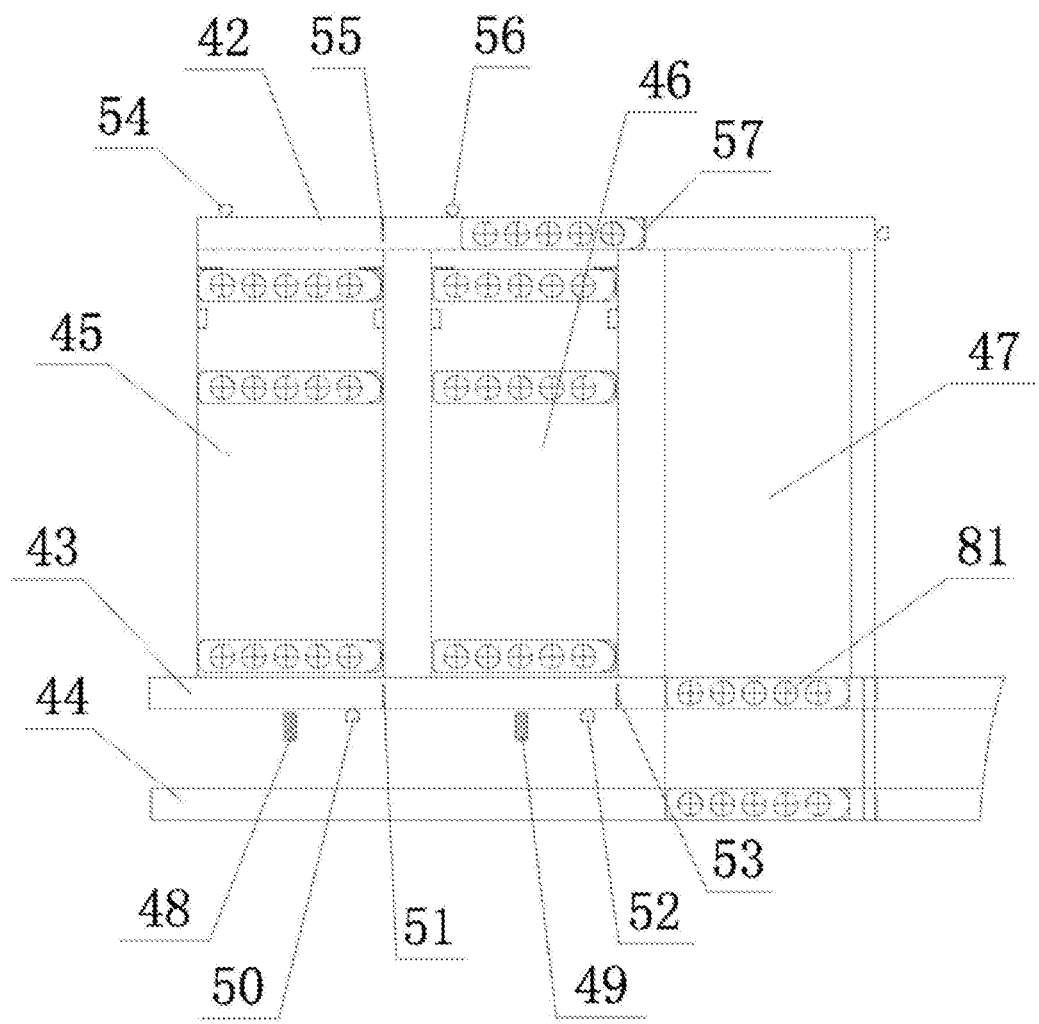
FIG. 1 is a schematic structural diagram of a biochemical analyzer delivery system of the present disclosure.

As shown in FIG. 1, the biochemical analyzer delivery system of the present disclosure comprises a sample feeding track 42, an advancing track 43, a recovery track 44, at least one to-be-tested sub-track 45, at least one emergency sub-track 46 and at least one return sub-track 47. The sample feeding track 42, the advancing track 43 and the return track 44 are parallel to each other. The to-be-tested sub-track 45, the emergency sub-track 46 and the return sub-track 47 are disposed between and perpendicular to the sample feeding track 42 and the advancing track 43. The sample feeding track 42, the advancing track 43 and the recovery track 44 are arrayed along the length direction of a biochemical analyzer. The to-be-tested sub-track 45, the emergency sub-track 46 and the return sub-track 47 are sequentially disposed along the length direction of the biochemical analyzer. The to-be-tested sub-track 45, the emergency sub-track 46 and the return sub-track 47 are disposed along the width direction of the biochemical analyzer. The sample feeding track 42, the advancing track 43, the recovery track 44, the to-be-tested sub-track 45 and the emergency sub-track 46 all make use of band carriers to deliver sample holders.

The connection part of the to-be-tested sub-track 45 and the advancing track 43 is provided with a to-be-tested sub-track inlet push plate 48 for pushing a sample holder on the advancing track 43 to the to-be-tested sub-track 45. To be specific, the to-be-tested sub-track inlet push plate 48 is mounted on a side of the connection part of the advancing track 43 and, the to-be-tested sub-track 45, so that when a conventional sample holder on the advancing track 43 stays at the inlet of the to-be-tested sub-track, the to-be-tested sub-track inlet push plate 48 can push it to the to-be-tested sub-track 45. In addition, the connection part of the emergency sub-track 46 and the advancing track 43 is provided with an emergency sub-track inlet push plate 49 for pushing a sample holder on the advancing track 43 to the emergency sub-track 46. Particularly, the emergency sub-track inlet push plate 49 is mounted on a side of the connection part of the advancing track 43 and the emergency sub-track 46, so that when an emergency sample holder on the advancing track 43 stays at the inlet of the emergency sub-track 46, the emergency sub-track inlet push plate 49 can push it to the emergency sub-track 46. Both the to-be-tested sub-track inlet push plate 48 and the emergency sub-track inlet push plate 49 are driven using an air cylinder, a motor or an eccentric component. The connection part of the to-be-tested sub-track 45 and the advancing track 43 is further provided with a to-be-tested sub-track inlet detector 50 and a to-be-tested sub-track inlet baffle 51. The connection part of the emergency sub-track 46 and the advancing track 43 is further provided with an emergency sub-track inlet detector 52 and an emergency sub-track inlet baffle 53.

One end proximate the sample feeding track 42 of the to-be-tested sub-track 45 is provided with a to-be-tested sub-track outlet pushing mechanism for pushing a sample holder on the to-be-tested sub-track 45 to the sample feeding track 42. One end proximate the sample feeding track of the emergency sub-track 46 is provided with an emergency sub-track outlet pushing mechanism for pushing a sample holder on the emergency sub-track 46 to the sample feeding track 42. Both the emergency sub-track outlet pushing mechanism and the to-be-tested sub-track outlet pushing mechanism share a same structure, but description about the structure of the to-be-tested sub-track outlet pushing mechanism is merely provided below. One end proximate the sample feeding track 42 of the to-be-tested sub-track 45 is provided with a to-be-tested sub-track outlet limit baffle mechanism. One end proximate the sample feeding track 42 of the emergency sub-track 46 is provided with an emergency sub-track outlet limit baffle mechanism. Both the emergency sub-track outlet limit baffle mechanism and the to-be-tested sub-track outlet limit baffle mechanism share a same structure, but description about the structure of the latter is merely provided below.

The to-be-tested sub-track 45 and the emergency sub-track 46 are same in structure, with the structure of the former merely described below to avoid repetition.

Figure 2:
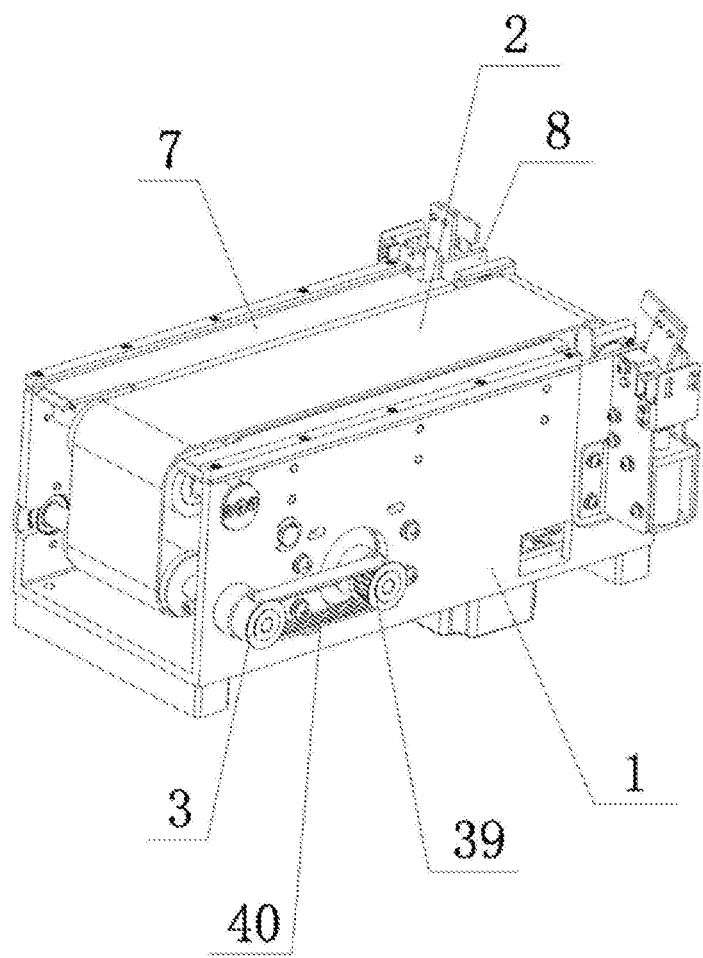
FIG. 2 is a schematic structural diagram of a biochemical analyzer track delivery system of the present disclosure.
Figure 3:
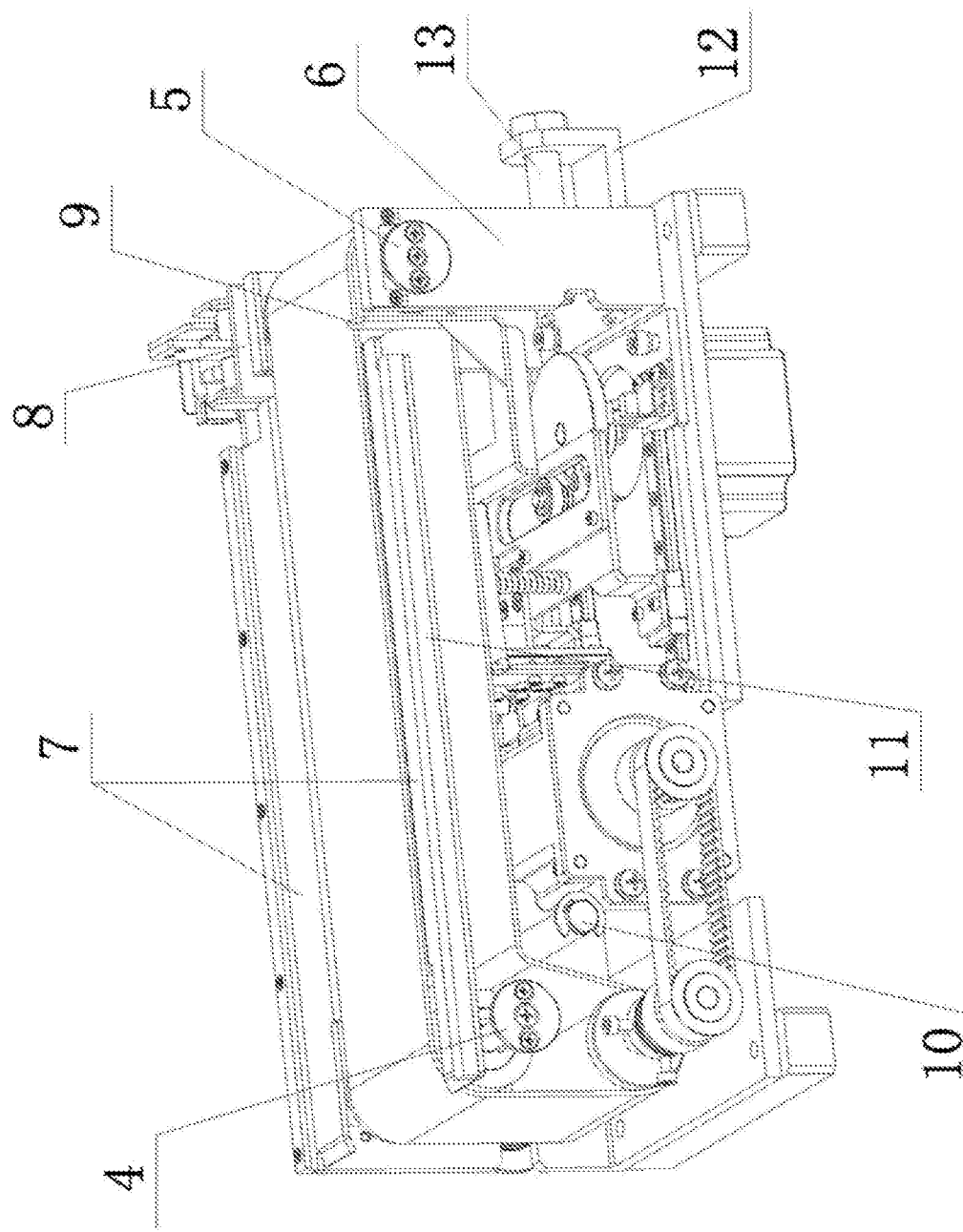
FIG. 3 is a partial schematic structural diagram of the biochemical analyzer track delivery system of the present disclosure.
Figure 4:
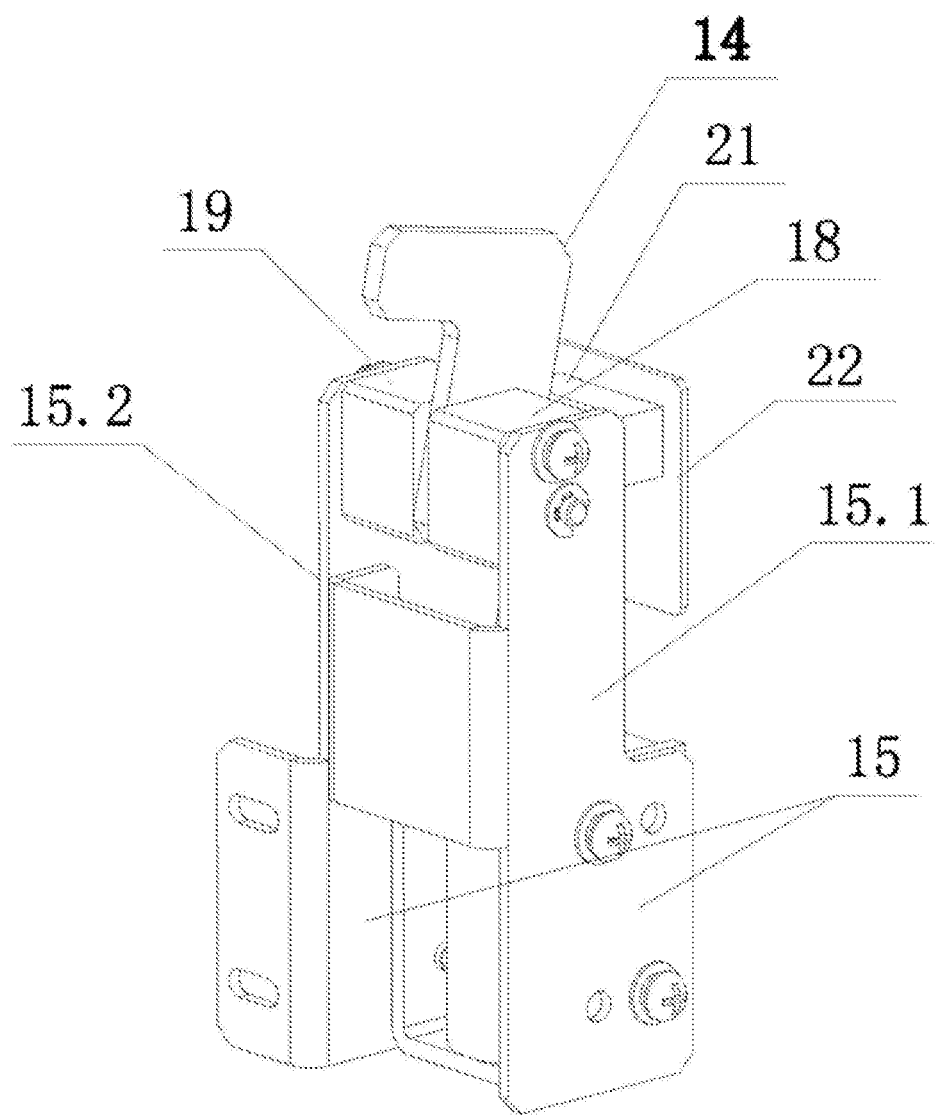
FIG. 4 is a schematic structural diagram of a track sample feeding limit mechanism of the biochemical analyzer track delivery system of the present disclosure.
Figure 5:
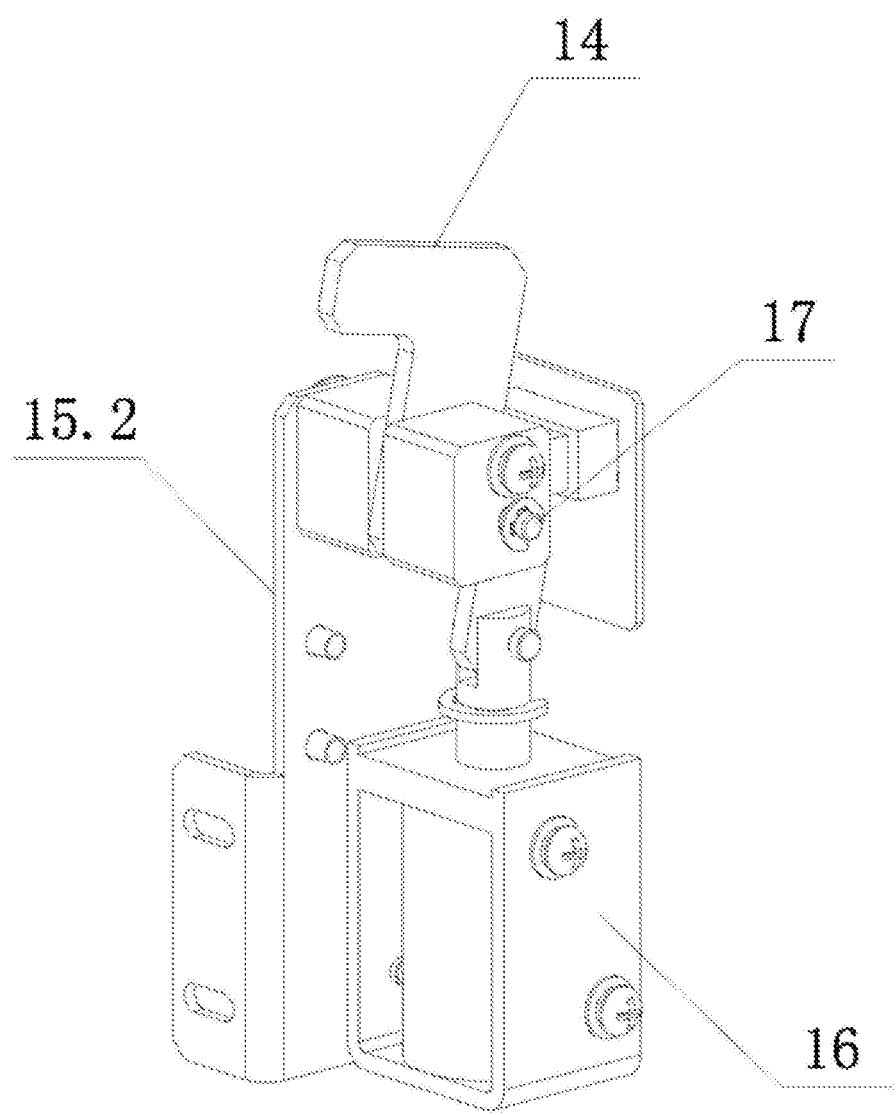
FIG. 5 is a schematic structural diagram of a track sample feeding limit mechanism of the biochemical analyzer track delivery system of the present disclosure, with a front fixing plate removed.
Figure 6:
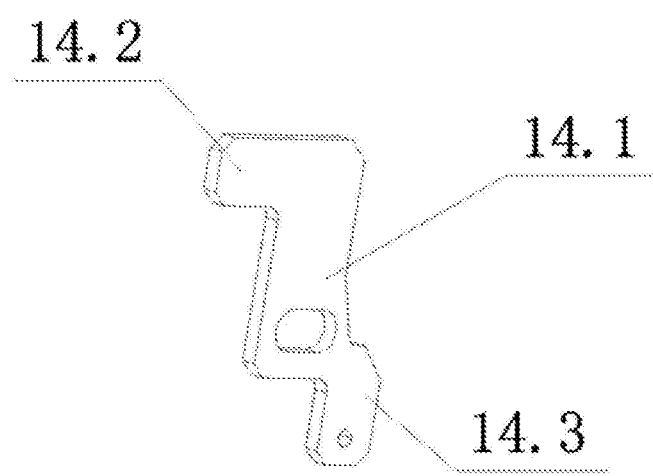
FIG. 6 is a schematic structural diagram of a baffle of the biochemical analyzer track delivery system of the present disclosure.
Figure 7:
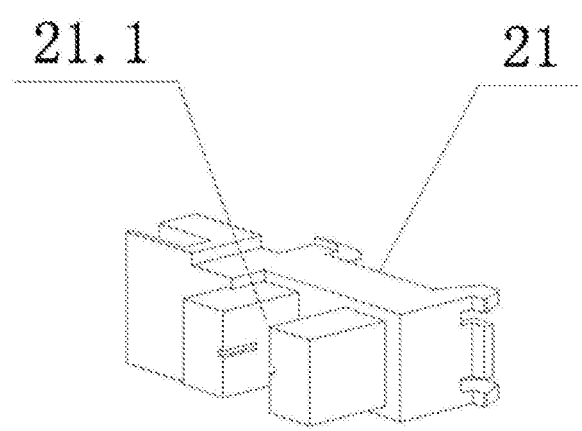
FIG. 7 is a schematic structural diagram of a first transmission-type optical interrupter of the biochemical analyzer track delivery system of the present disclosure.
Figure 8:
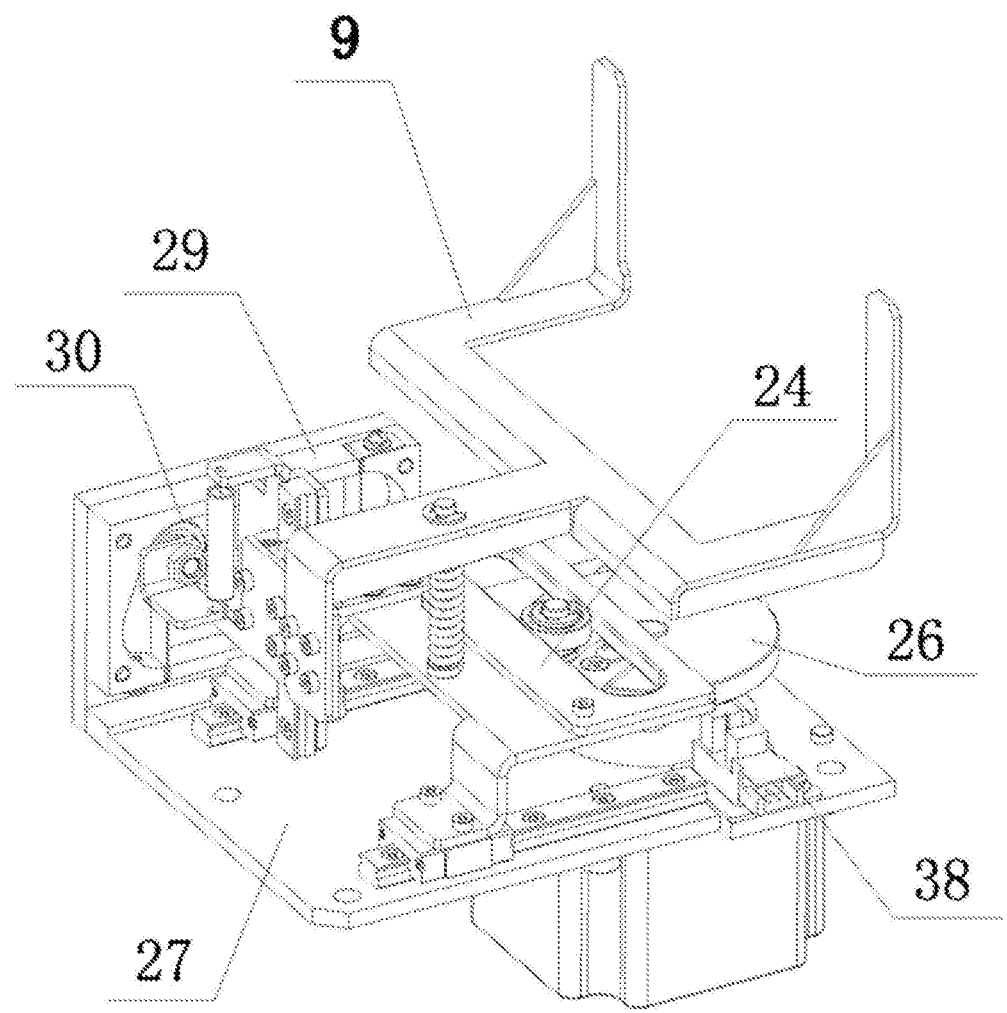
FIG. 8 is a schematic diagram of a stereostructure of a biochemical analyzer sample feeding pushing mechanism of the present disclosure.
Figure 9:
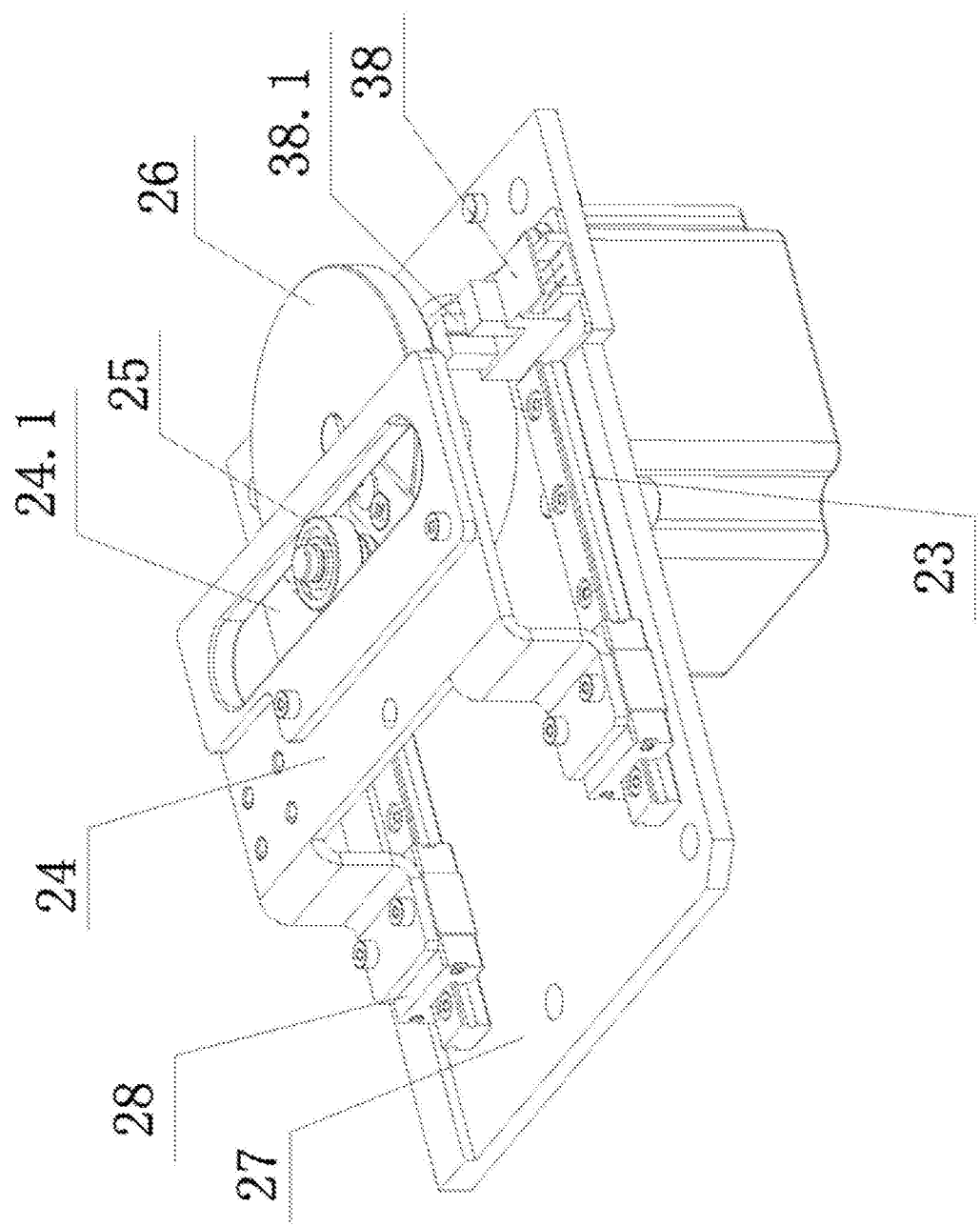
FIG. 9 is a partial schematic structural diagram of the biochemical analyzer sample feeding pushing mechanism of the present disclosure.
Figure 10:
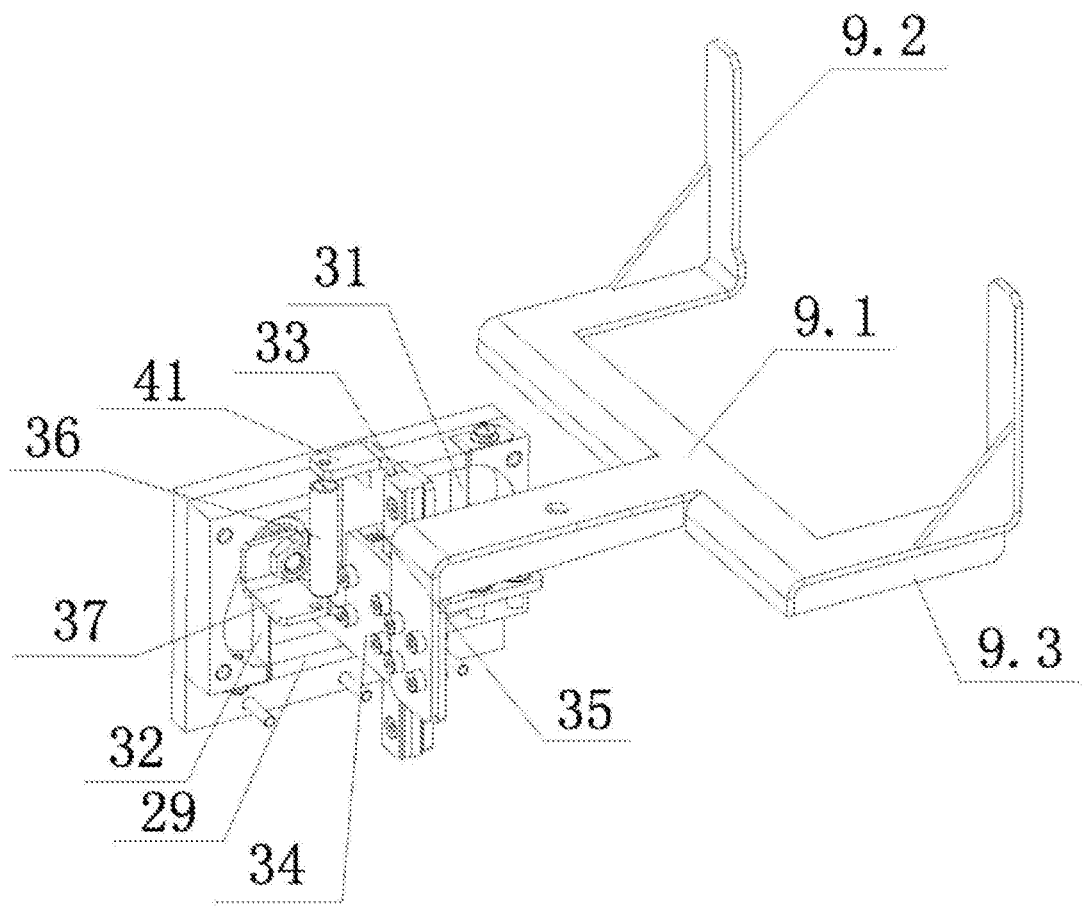
FIG. 10 is a partial schematic structural diagram of the biochemical analyzer sample feeding pushing mechanism of the present disclosure.
Figure 11:
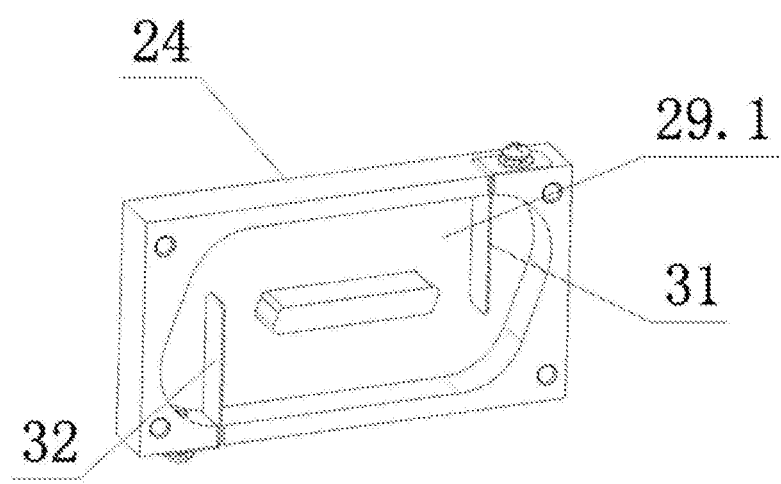
FIG. 11 is a schematic structural diagram of a lifting guide plate of the biochemical analyzer sample feeding pushing mechanism of the present disclosure.
Figure 12:
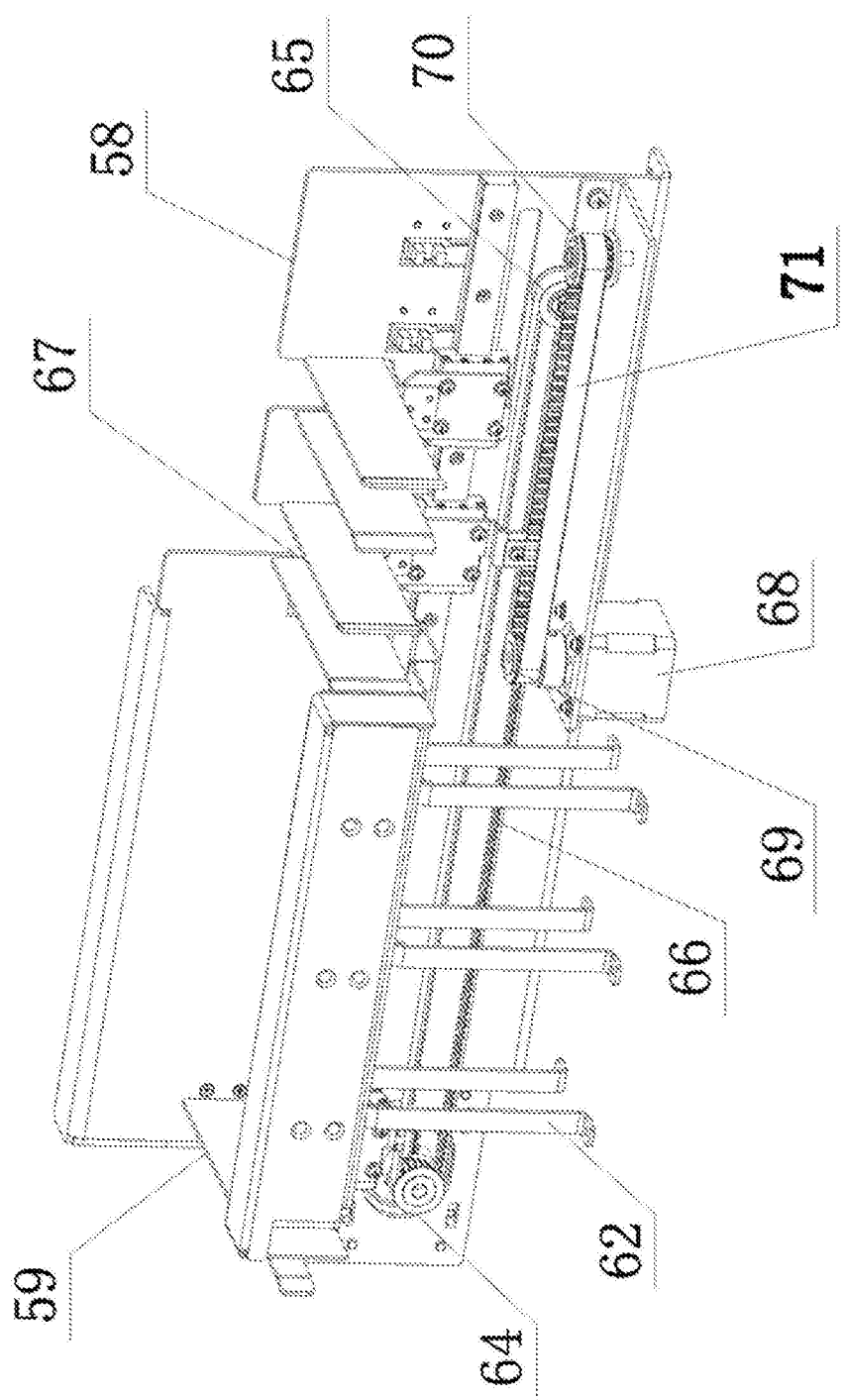
FIG. 12 is a schematic diagram of a stereostructure of a biochemical analyzer sample recovery system of the present disclosure.
Figure 13:
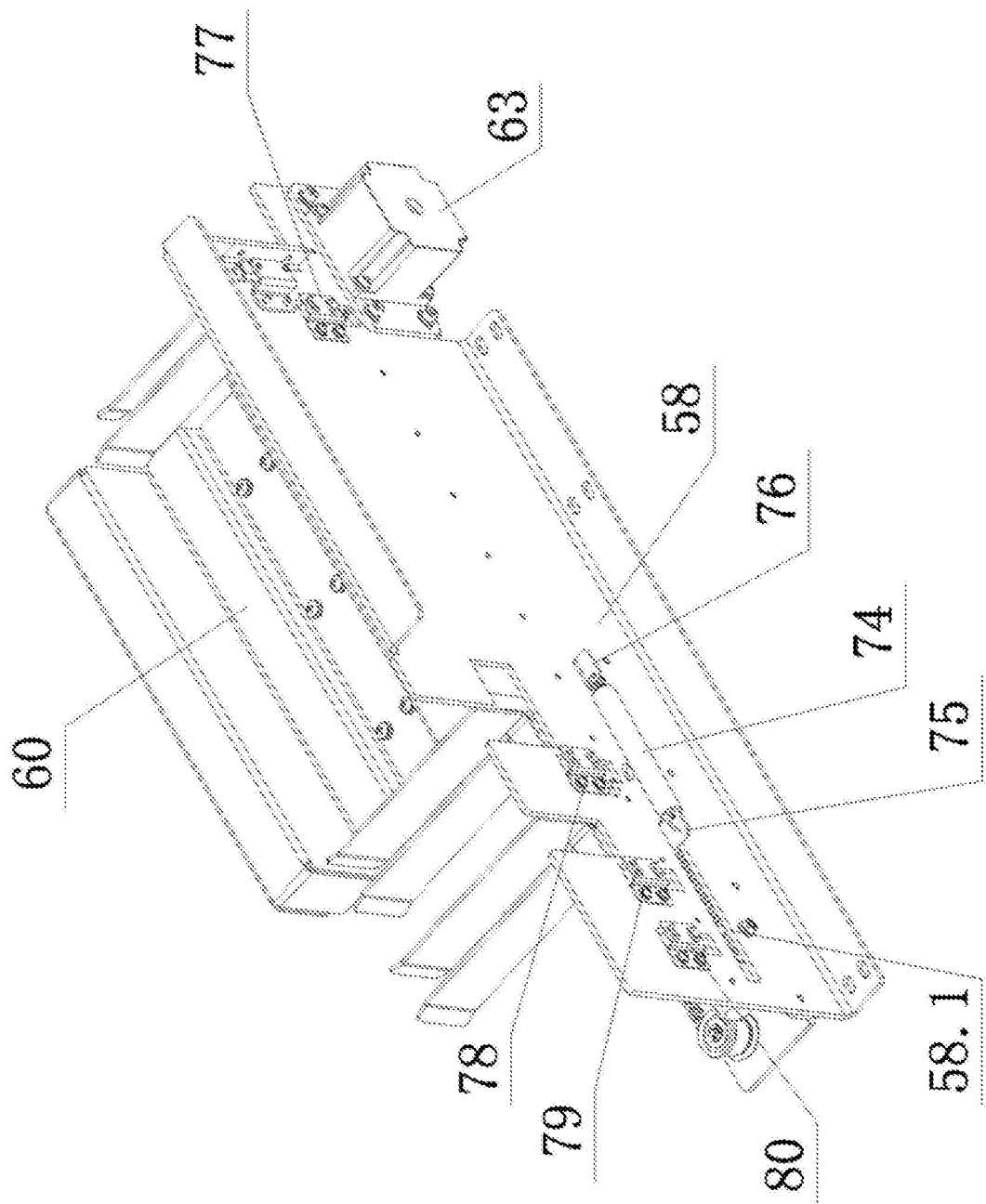
FIG. 13 is a schematic diagram of a stereostructure of the biochemical analyzer sample recovery system of the present disclosure, viewed from another angle.
Figure 14:
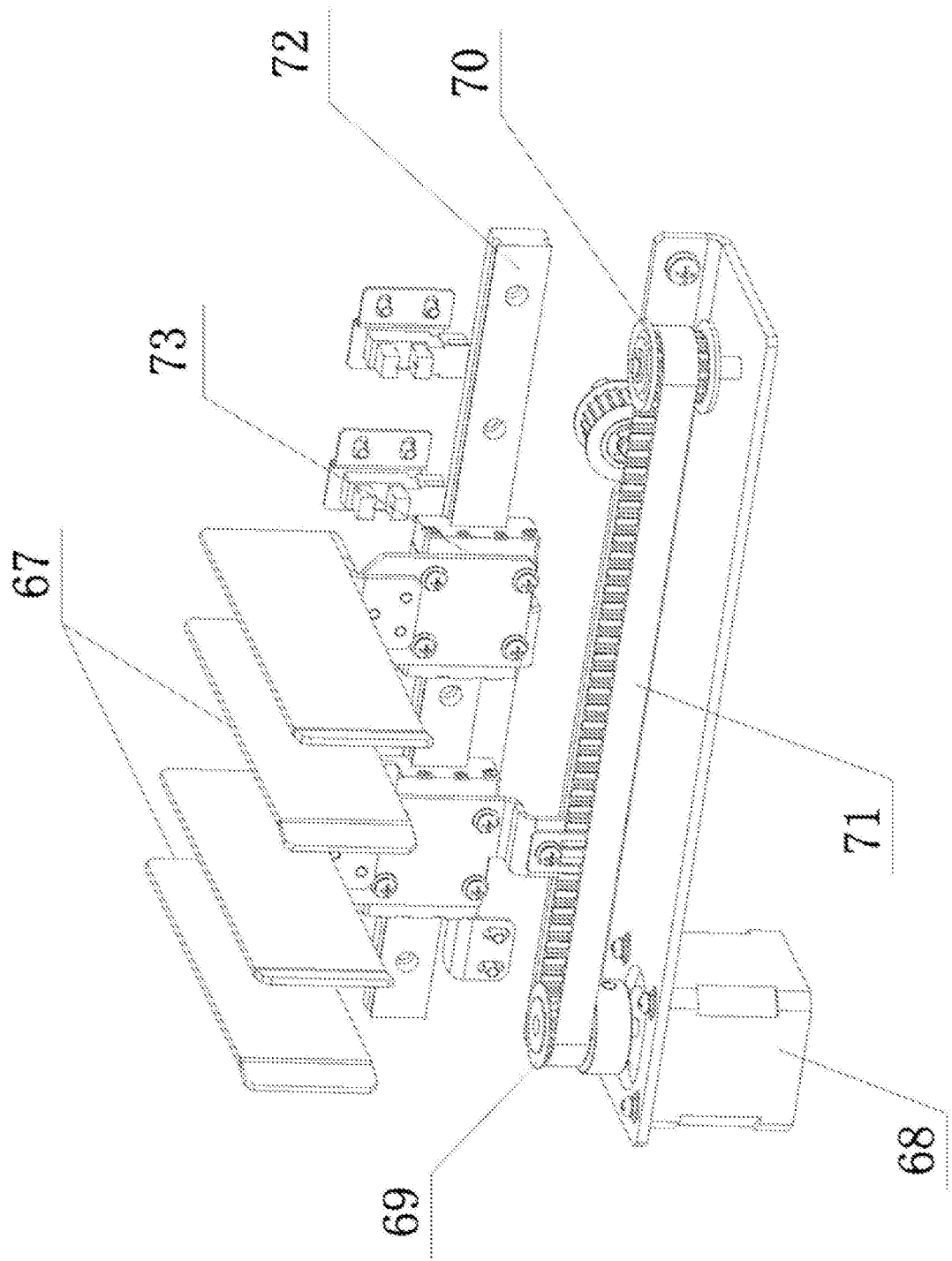
FIG. 14 is a schematic diagram of a stereostructure of a bridging avoidance component of the biochemical analyzer sample recovery system of the present disclosure.
Figure 15:
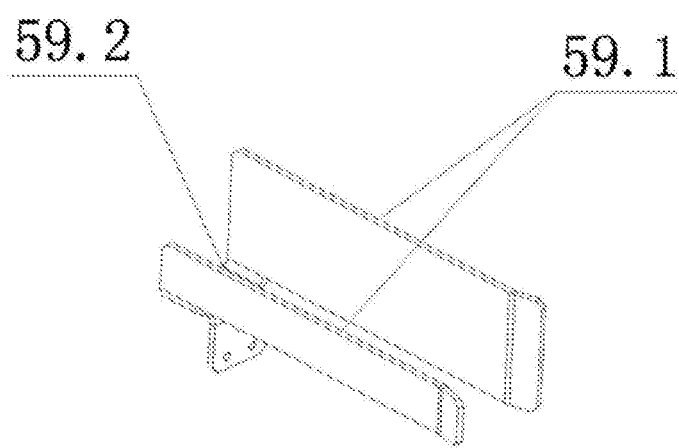
FIG. 15 is a schematic diagram of a stereostructure of a return transmission rack of the biochemical analyzer sample recovery system of the present disclosure.
Figure 16:
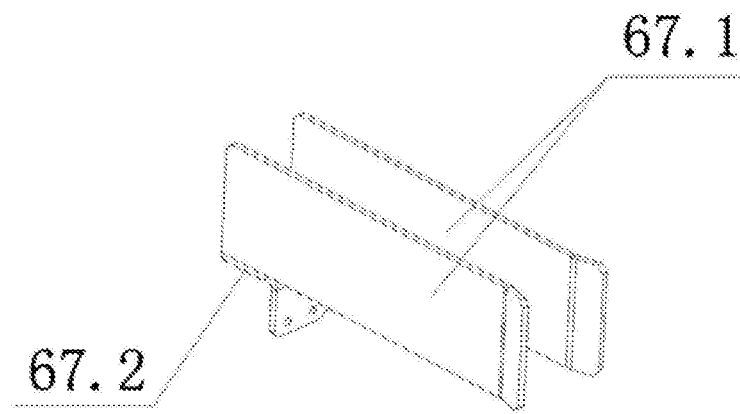
FIG. 16 is a schematic diagram of a stereostructure of a bridging frame of the biochemical analyzer sample recovery system of the present disclosure.
Figure 17:
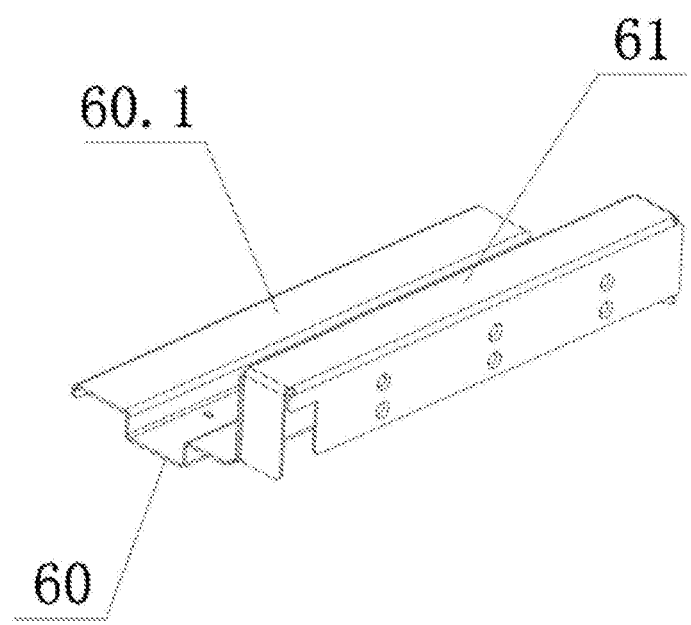
FIG. 17 is a schematic diagram of a stereostructure of a retainer plate of the biochemical analyzer sample recovery system of the present disclosure.

Referring to FIGS. 1 and 2, a first support 1 provided on the to-be-tested sub-track is comprised by a conveyer belt assembly and a to-be-tested sub-track outlet limit baffle mechanism. The to-be-tested sub-track outlet limit baffle mechanism at the sample outlet of the conveyer belt assembly performs limiting on a sample holder at the sample outlet of the conveyer belt assembly. The first support 1 also includes a to-be-tested sub-track outlet pushing mechanism for pushing a sample holder at the sample outlet of the conveyer belt assembly to be away from the conveyer belt assembly.

The conveyer belt assembly comprises a conveyer belt 2, a first drive component and a support component. The support component is mounted on the first support 1 for driving the conveyer belt to transmit. The conveyer belt 2 is supported on, the support component. The first drive component drives the support component to operate.

The support component comprises a driven wheel 3, a first idle wheel 4 and a second idle wheel 5. The first idle wheel 4 is mounted within one end of the first support 1. The second idle wheel 5 for adjusting degree of tightness of the conveyer belt 2 is installed on an adjusting rack 6. The adjusting rack 6 is adjustably arranged within the other end of the first support 1. The conveyer belt 2 is supported on the driven wheel 3, the first idle wheel 4 and the second idle wheel 5. The driven wheel 3 is connected with the first drive component. A first motor serves as the first drive component, with its output end connected with a drive wheel 39. A band carrier 40 is connected between the drive wheel 39 and the driven wheel 3. A slide plate 7 is arranged between two sides of the upper end face of the conveyer belt 2 and the first support 1, and forms a sample holder delivery passage together with the upper end face of the conveyer belt 2. The adjusting rack 6 is located at the sample outlet of the sample holder delivery passage. Space 8 is reserved between two sides of the adjusting rack 6 and two sides of the first support 1. Below the conveyer belt 2, the to-be-tested sub-track outlet pushing mechanism is provided. The upper end of a push plate 9 of the to-be-tested sub-track outlet pushing mechanism stretches into the space 8 to push a sample holder on, the sample outlet of the sample holder delivery passage to be away from the sample holder delivery passage. The first support 1 also includes a tensioning wheel 10 pressed at the underside of the lower end face of the conveyer belt 2. Anti-roll depression bars are disposed at the upper sides of the first and second idle wheels.

A support plate 12 with a bolt through hole is mounted on the end face of the other end of the first support 1. The adjusting rack 6 is in sliding fit on a baseplate of the first support 1. A baseplate of the adjusting rack 6 has a threaded connecting plate (not shown) in which a threaded hole is formed. A stud of the bolt 13 is connected inside the threaded hole of the threaded connecting plate after penetrating through the bolt through hole in the support plate 12. A nut of the bolt 13 is limited at the outer side of the support plate 12. Two ends of the second idle wheel 5 are hinged to two side walls of the upper end of the adjusting rack 6. In case of rotating the bolt, the adjusting rack 6 can move back and forth on the baseplate of the first support 1, thereby adjusting the distance between the first idle wheel 4 and the second idle wheel 5 and the degree of tightness of the conveyer belt 2. There is a waist-shaped adjustment bole in the baseplate of the adjusting rack 6. A stop screw is mounted on the baseplate of the first support 1. The baseplate of the adjusting rack 6 that is limited at the underside of the nut of the stop screw may slide on the baseplate of the first support 1. There exists relative displacement between the waist-shaped adjustment hole and the stop screw.

Referring to FIGS. 3-6, the to-be-tested sub-track outlet limit baffle mechanism comprises a baffle 14, a second support 15 and an electromagnet 16 on the second support 15. The second support 15 is secured on the first support 1. The baffle is composed of a body 14.1 hinged on the second support 15. One side of the upper end of the body 14.1 is provided with an occulting bar 14.2 transversely disposed, whilst a pull rod 14.3 is longitudinally provided on the other side of the lower end of the body 14.1. The upper end of an armature of the electromagnet 16 is articulated with the lower end of the pull rod 14.3. The occulting bar 14.2 is above the sample outlet of the conveyer belt assembly.

The second support 14 comprises a front fixing plate 15.1 and a rear fixing plate 15.2 mutually connected to each other. The baffle 14 and the electromagnet 16 as well as an articulated shaft 17 are disposed between the front fixing plate 15.1 and the rear fixing plate 15.2. A hinge hole is formed in the body 1.4.1 that is hinged on the articulated shaft 17 via the hinged hole. A front limiting block 18 and a rear limiting block 19 are separately disposed between the body 14.1, and the front fixing plate 15.1 and the rear fixing plate 15.2. The rear fixing plate 15.2 is provided with a mounting plate 20 connected on the first support 1.

The rear fixing plate 15.2 is further provided with a first transmission-type optical interrupter 21 which is arranged outside the other side of the body 14.1, provided with a first interrupt slot 21.1 for the other side of the body 14.1 to pass through and fixed on the rear fixing plate 15.2 by means of a support body 22.

The to-be-tested sub-track outlet limit baffle mechanism operates as the working principle below: when the electromagnet 16 is connected or disconnected, the armature moves up and down so as to drive the pull rod 14.3 to move up and down, thereby stimulating the baffle 14 to rotate and the occulting bar 14.2 to swing left and right, thus limiting a sample holder.

Further referring to FIGS. 7-10, the to-be-tested sub-track outlet pushing mechanism also comprises horizontal guide rails 23, a second drive component, a propulsive guide plate 24, a thrust roller 25 and a rotating wheel 26 below the conveyer belt 2. The propulsive guide plate 24 where the push plate 9 is connected is in sliding fit on the horizontal guide rails 23. The rotating wheel 26 is driven by the second drive component to rotate. The thrust roller 25 is eccentrically arranged on one side of the rotating wheel 26. The propulsive guide plate 24 has a guide groove 24.1 forming an included angle with each of the horizontal guide rails 23 in their length directions. The thrust roller 25 is in sliding fit in the guide groove 24.1. In this embodiment, the guide groove 24.1 forms an included angle of 90° with each of the horizontal guide rails 23 in their length directions. A motor serves as the second drive component.

The to-be-tested sub-track outlet pushing mechanism also comprises a thrust baseplate 27 fixed on the baseplate of the first support 1. Two horizontal guide rails 23 are parallelly arranged on the thrust baseplate 27. Two sides of the propulsive guide plate are each provided with a second slider 28 sliding fit on the horizontal guide rails 23 in a one-to-one correspondence manner. The motor and the rotating wheel 26 are separately arranged below and above the thrust baseplate 27. An output shaft of the motor runs through the thrust baseplate 27 to be connected with the rotating wheel 26.

The to-be-tested sub-track outlet pushing mechanism also comprises a lifting mechanism having a lifting guide plate 29 at one side of the push plate 9. One side proximate the push plate 9 of the lifting guide plate 29 is provided with a circular lifting guide groove 29.1. A guide roller 30 sliding fit in the lifting guide groove 29.1 is arranged at one side of the push plate 9 that can be movably connected to the propulsive guide plate 24 up and down.

One end at the upper side of lifting guide groove 29.1 is provided with an upper elastic sheet 31 pressing the guide roller 30 downward, is e., the upper elastic sheet 31 is contained in the lifting guide groove 29.1, but with its lower end suspended in the air. Space is reserved between the upper elastic sheet 31 and the side wall of one end of the lifting guide groove 29.1. The other end at the lower side of the lifting guide groove 29.1 is provided with a lower elastic sheet 32 pushing the guide roller 30 upward, i.e., the lower elastic sheet 32 is contained in the lifting guide groove 29.1, but with its upper end suspended in the air. Space is also reserved between the lower elastic sheet 32 and the side wall of the other end of the lifting guide groove 29.1.

The propulsive guide plate 24 is provided with vertical guide rails 33 where the push plate 9 is in sliding fit. The vertical guide rails 33 are secured on the propulsive guide plate 24 through a propulsive mounting plate 41. The push plate 9 is connected with a fixing plate 34 on which a first slider 35 is fixed. The first slider 35 is in sliding fit on the vertical guide rails 33. A tension spring 36 is arranged between the propulsive mounting plate 41 and the fixing plate 34. The upper and lower ends of the tension spring 36 are respectively connected with the propulsive mounting plate 41 and the fixing plate 34. One side of the fixing plate 34 is also provided with a third support 37 on which the guide roller 30 is connected. The lower end of the tension spring 36 is connected to the third support 37.

One end at the upper side of the thrust baseplate 27 is provided with a second transmission-type optical interrupter 38 with a second interrupt slot 38.1 thereon. The push plate 9 has a propulsive baffle for penetrating through second interrupt slot 38.1 to block light rays therein. In this embodiment, when the push plate 9 reciprocates and just descends to the lowest position, the propulsive baffle 9.3 is contained in the second interrupt, slot 38.1 of the second transmission-type optical interrupter 38.

The to-be-tested sub-track outlet pushing mechanism operates as the working principle below a stepping motor drives the thrust roller 25 to do eccentric rotation motion, and Y-direction linear motion in the guide groove 24.1 of the propulsive guide plate 24. The propulsive guide plate 24 is propelled to slide on the horizontal guide rails 23 to complete X-direction linear motion, thereby further promoting, the push plate 9 to do X-direction linear motion. Driven by the push plate 9, the guide roller 30 does X-direction linear motion in the lifting guide groove 29.1 and completes sample pushing until moving to the upper elastic sheet 31, at this time, the upper elastic sheet 31 produces a downward pressure to the guide roller 30 so as to force the push plate 9 connected with the first slider 35 to move downward along the vertical guide rails 33. At this moment, the propulsive guide plate 24 properly achieves its maximum stroke in the X direction and the push plate 9 begins to return. In the returning process, under the joint effect of the lower elastic sheet 32 and the tension spring 36, the push plate is forced to move upward along the vertical guide rails 33 so as to prepare for pushing of next sample.

In this embodiment, the push plate 9 also comprises a push plate body 9.1 and two pushing plates 9.2. The push plate body 9.1 is connected with the fixing plate 34. The two pushing plates 9.2 are respectively arranged at two sides of the push plate body 9.1 upwards and stretch into the space 8. By adopting the abovementioned structure, it is firmer to push a sample holder.

The to-be-tested sub-track operates as the working principle below a sample holder is placed on the conveyer belt 2 whereby delivery of the sample holder is completed. The to-be-tested sub-track outlet limit baffle mechanism makes accurate positioning on the delivery process of a sample holder, so when the sample holder arrives at the to-be-tested sub-track outlet limit baffle mechanism, the conveyer belt stops working, the to-be-tested sub-track outlet limit baffle mechanism starts to avoid, and a reciprocating to-be-tested sub-track outlet pushing mechanism starts to push the sample holder to a sample suction track (i.e., a vertical track). In the sample holder delivery process, anti-roll depression bars play a protection role to ensure steady advancing of the sample holder.

The connection part of the to-be-tested sub-track 45 and the sample feeding track 42 is provided with a tested sample in-place detector 54 and a conventional avoiding shield 55. The connection part of the emergency sub-track 46 and the sample feeding track 42 is provided with an emergency sample in-place detector 56 and a sequential sample suction shield 57.

The return sub-track 47 is equipped with a return transmission rack reciprocating among the return sub-track 47, the sample feeding track 42, the advancing track 43 and the recovery track 44 via a drive mechanism. The return transmission rack is used for delivering sample holders on the sample feeding track 42 to the advancing track 43 or the recovery track 44. The connection part of the sample feeding track 42 and the return sub-track 47 is provided with a return sample holder in-place detector 33. A bridging avoidance component is disposed between the advancing track 43 and the recovery track 44, for bridging the advancing track 43 and the recovery track 44 and avoiding the return transmission rack.

The return sub-track comprises a fourth support 58 having a return delivery region and a bridging avoidance region in mutual carry-on. The return delivery region comprises a return delivery component and the bridging avoidance region comprises a bridging avoidance component. The return delivery component comprises a delivery track and a return transmission rack 59 reciprocating between the return delivery region and the bridging avoidance region under the drive of a first drive mechanism. The return transmission rack 59 is used for delivering sample holders in the return delivery region and the bridging avoidance region.

The delivery track comprises a retainer plate 60 of which two sides are respectively provided with a return baffle 61. A sample holder return delivery passage is formed between the retainer plate 60 and the return baffles 61 at two sides. The return baffle at one side of the retainer plate 60 is connected with the fourth support 58, while the one at the other side is connected with the retainer plate 60. Underneath the retainer plate 60A, a support frame 62 is arranged for supporting it. In mounting, the support frame 62 is fixed on a rack of the biochemical analyzer.

The first drive mechanism comprises a third motor 63, a first drive wheel 64, a first driven wheel 65 and a first band carrier 66. The third motor 63 and the first driven wheel 65 are mounted on the fourth support 58. The first drive wheel 64 is mounted on the output shaft of the third motor 63. The first band carrier 66 is connected between the first drive wheel 64 and the first driven wheel 65. The first band carrier 66 is parallel to the delivery track. The return transmission rack 59 is connected on the first band carrier 66 running through the return delivery region and the bridging avoidance region. The return transmission rack 59 comprises two parallel clamp plates 59.1 one ends of which are connected via a connecting plate 59.2. Space for containing a sample holder is formed between the two clamp plates 59.1. The connecting plate 59.2 is connected with the first band carrier 66.

The middle part of the retainer plate 60 protrudes upwards to form a boss 60.1. The connecting plate 59.2 is arranged at the lower sides of one ends of the two clamp plates 59.1. When the return transmission rack 59 slides on the retainer plate 60, the connecting plate 59.2 is contained in one side of the boss 60.1 of the retainer plate 59.2. The upper surface of the connecting plate 59.2 levels with that of the boss 60.1. During working, a sample holder slides on the upper surface of the boss 60.1, but one end thereof is placed on the upper surface of the connecting plate 59.2. In case the return transmission rack 59 is outside the end of the delivery track, the connecting, plate 59.2 engages with other tracks, the upper surface of the connecting plate 59.2 levels with those of other tracks, and the clamp plates 59.1 at two sides are arranged at two sides of the other tracks. When a sample holder is delivered between the two clamp plates 59.1 and one end thereof is lap jointed on the connecting plate 59.2, the, sample holder can be delivered to the delivery track by driving the return transmission rack 59. When delivering a sample holder to the advancing track 43 or the recovery track 44 via the delivery track, the return transmission rack 59 is capable of engaging with the advancing track 43 or the recovery track 44 by the same manner, and the sample holder 81 is delivered to the advancing track 43 or the recovery track 44. After the sample holder 81 leaves, the return transmission rack 59 is returned to the delivery track.

The bridging avoidance component comprises a bridging frame 67 and a second drive mechanism connected to the fourth support 58. The bridging frame 67 is connected to the second drive mechanism driving the bridging frame 67 to reciprocate. The bridging frame 67 is arranged at the outer side of one end of the delivery track. The second drive mechanism comprises a fourth motor 68, a second drive wheel 69, a second driven wheel 70 and a second band carrier 71. The fourth motor 68 and the second driven wheel 70 are mounted on the fourth support 58. The second drive wheel 69 is mounted on the output shaft of the fourth motor 68. The second band carrier 71 is connected between the second drive wheel 69 and the second driven wheel 70. The bridging frame 67 is connected to the second driven wheel 70.

The bridging frame 67 comprises two parallel bridging plates 67.1 of which the lower sides of one ends are connected via a connector 67.2. Space for accommodating the sample holder 81 is formed between the two bridging plates 67.1. The connector 67.2 is connected with the second band carrier 71. The bridging frame 67 also comprises an advancing track bridging frame for bridging with the advancing track 43 of a biochemical analyzer and a recovery track bridging frame for bridging with the recovery track 44 of the biochemical analyzer.

The advancing track bridging frame and the recovery track bridging frame share the same working principle with the return transmission rack. The advancing track bridging frame is used for bridging with the advancing track 43 and the recovery track bridging frame is used for bridging with the recovery track 44. A connector of the advancing track bridging frame engages with the advancing track. As two ends of the advancing track bridging frame are open, the sample holder 81 may arrive at next delivery track via the advancing track bridging frame, and under the effect of a drive mechanism, the advancing track bridging frame and the recovery track bridging frame can move so as to deliver the sample holder 81 on the advancing track 4.3 to the recovery track 44. Movement of the advancing track bridging frame and the recovery track bridging frame also produces the effect of avoiding the return transmission rack 59 so as to ensure that the sample holder 81 on the return transmission rack 59 is smoothly delivered to the advancing track 43 or the recovery track 44.

A linear guide rail 72 is provided on the fourth support 58 in the vicinity of the second band carrier 71 and also parallel to the second band carrier 71. The connector 67.2 has a slider 73 sliding fit on the linear guide rail 72. The advancing track bridging frame is joined to the second band carrier 71. At the rear side of the recovery track bridging frame, the fourth support 58 is provided with a strip-shaped hole 58.1 extending along the motion direction of the recovery track bridging frame. The rear side of the connector of the recovery track bridging frame has a sliding plate 75 sliding fit inside the strip-shaped hole 58.1. A tension spring connector 76 is arranged at the rear side of the fourth support 58 and in the vicinity of the initial end from which the sliding plate 75 of the strip-shaped hole 58.1 begins to slide. A return tension spring 74 is disposed between the tension spring connector 76 and the sliding plate 75 and plays a role in positioning and returning the recovery track bridging frame, i.e., the recovery track bridging frame is positioned on the initial end from which the sliding plate 75 of the strip-shaped hole 58.1 begins to slide under the effect of the return tension spring 74. When the advancing track bridging frame, under the effect of the second band carrier 71, moves towards the recovery track bridging frame, the recovery track bridging frame also slides as a result of propulsion of the advancing track bridging frame, and the return tension spring 74 is tensioned by an outer force. But when the advancing track bridging frame moves reversely, the recovery track bridging frame also slides reversely under the effect o the return tension spring 74 and then returns to the initial position.

A first position detector 77 is provided at the inlet of the delivery track of the return transmission rack on the fourth support 58. When the return transmission rack 59 arrives in the inlet of the delivery track, the first position detector 77 generates a signal. Three position detectors are disposed in the location, within the bridging avoidance region, of the fourth support 58. When the return transmission rack avoids the advancing track 43, the advancing track bridging frame is located at a second position detector 78, and the recovery track bridging frame is located at a third position detector 79. However, when the return transmission rack avoids the sample recovery track, the advancing track bridging frame is located at the third position detector 79, while the recovery track bridging frame is at a fourth, position detector 80.

The to-be-tested sub-track of the present disclosure operates as the working principle below: when the to-be-tested sub-track inlet detector detects out that a sample holder enters, the to-be-tested sub-track inlet push plate starts to push the sample holder to the to-be-tested sub-track. Meanwhile, a conveyer belt of the to-be-tested sub-track starts to deliver the sample holder to the to-be-tested sub-track outlet limit baffle mechanism, and then the conveyer belt of the to-be-tested sub-track stops working. If no sample holder exists on the sample feeding track, the to-be-tested sub-track outlet limit baffle mechanism starts to avoid, and then the to-be-tested sub-track outlet pushing mechanism starts to push the sample holder to the sample feeding track. Once the tested sample in-place detector detects out that a sample holder is in place, the to-be-tested sub-track outlet pushing mechanism resets, meanwhile, the to-be-tested sub-track outlet limit baffle mechanism also resets, and the sample feeding track starts to deliver the sample holder. In the presence of a sequential sample suction baffle (including a code disc) of the to-be-tested sub-track, a sample suction needle may sequentially suck the samples required from the sample holder. After completion of sample suction of all samples on the sample holder, if the return sample holder in-place detector detects out that there is a sample holder, the return sub-track starts to work to push the sample holder to the advancing track (to next testing unit), or deliver the sample holder to the return sub-track for recovery. After completion of delivery of the sample holders, the return sub-track resets. That is to say, testing of next sample holder is in preparation.

In need of emergency testing, when an emergency sub-track inlet detector detects out the existence of a sample holder, an emergency sub-track inlet push plate starts to push an emergency sample to the emergency sub-track, a conveyer belt of the emergency sub-track delivers the emergency sample to the emergency sub-track outlet limit baffle mechanism, and then stops working. At this time, if a conventional sample suction test is performed on the sample feeding track, a sample suction needle completes sample suction of the sample and records the position of the sample in test. Then the stepping motor of the sample feeding track rotates reversely to deliver the sample holder to a conventional avoiding shield, in such the case, the conventional avoiding shield starts to block working of the sample holder, and the stepping motor of the sample feeding track stops. When all is ready, the emergency sub-track outlet limit baffle mechanism starts to avoid, and the emergency sub-track outlet pushing mechanism starts to push the emergency sample to the to-be-tested sub-track. When the emergency sample in-place detector detects out the existence of an emergency sample holder, the emergency sub-track outlet limit baffle mechanism and the emergency sub-track outlet pushing mechanism both reset. Further, the stepping motor of the sample feeding track rotates forward to deliver the emergency sample to a sample suction site for sample suction. After completion of sample suction of the emergency sample, it is delivered to next testing unit by means of the conveyer belt of the return sub-track or returned to the return sub-track for recovery. Following reset of the return sub-track, the sequential sample suction shield moves to the previous sample suction site of a conventional sample holder, the conventional avoiding shield resets, the sample holder waiting for sample suction is released, and the conventional sample.

We claim:

1. A biochemical analyzer delivery system, comprising:
a sample feeding track, an advancing track, a recovery track, at least one to-be-tested sub-track, at least one emergency sub-track and at least one return sub-track; the sample feeding track, the advancing track and the recovery track are parallel to each other; the to-be-tested sub-track, the emergency sub-track and the return sub-track are disposed between and perpendicular to the sample feeding track and the advancing track; an emergency sample may enter the emergency sub-track via the advancing track, and then enters the sample feeding track for sample suction; a sample holder on the sample feeding track is delivered to the advancing track by the return sub-track for next test or to the recovery track for recovery.

2. A biochemical analyzer delivery system of claim 1, wherein the to-be-tested sub-track, the emergency sub-track and the return sub-track are arrayed sequentially along the length direction of the biochemical analyzer.

3. A biochemical analyzer delivery system of claim 1, wherein the junction part of the to-be-tested sub-track and the advancing track is provided with a to-be-tested sub-track inlet push plate for pushing a sample holder on the advancing track to the to-be-tested sub-track; the junction part of the emergency sub-track and the advancing track is provided with an emergency sub-track inlet push plate for pushing a sample holder on the advancing track to the emergency sub-track.

4. A biochemical analyzer delivery system of claim 3, wherein the junction part of the to-be-tested sub-track and the advancing track is further provided with a to-be-tested sub-track inlet detector and a to-be-tested sub-track inlet baffle; the junction part of the emergency sub-track and the advancing track is further provided with an emergency sub-track inlet detector and an emergency sub-track inlet baffle.

5. A biochemical analyzer delivery system of claim 1, wherein one end proximate the sample feeding track of the to-be-tested sub-track is provided with a to-be-tested sub-track outlet push plate for pushing a sample holder on the to-be-tested sub-track to the sample feeding track; one end proximate the sample feeding track of the emergency sub-track is provided with an emergency sub-track outlet pushing mechanism for pushing a sample holder on the emergency sub-track to the sample feeding track.

6. A biochemical analyzer delivery system of claim 5, wherein one end proximate the sample feeding track of the to-be-tested sub-track is further provided with a to-be-tested sub-track outlet limit baffle mechanism; one end proximate the sample feeding track of the emergency sub-track is provided with an emergency sub-track outlet limit baffle mechanism.

7. A biochemical analyzer delivery system of claim 1, wherein the junction part of the to-be-tested sub-track and the sample feeding track is provided with a to-be-tested sample in-place detector and a conventional avoiding shield; the junction part of the emergency sub-track and the sample feeding track is provided with an emergency sample in-place detector and a sequential sample, suction shield.

8. A biochemical analyzer delivery system of claim 1, wherein the return sub-track has a return transmission rack that reciprocates among the return sub-track, the sample feeding track, the advancing track and the recovery track for delivering a sample holder on the sample feeding rack to the advancing track or the recovery track.

9. A biochemical analyzer delivery system of claim 8, wherein the junction part of the sample feeding track and the return sub-track is provided with a return sample holder in-place detector.

10. A biochemical analyzer delivery system of claim 8, wherein a bridging avoidance component is disposed between the advancing track and the recovery track, for bridging the advancing track with the recovery track and avoiding the return transmission rack.

* * * * *